US011904840B2

(12) United States Patent
Iwazawa et al.

(10) Patent No.: US 11,904,840 B2
(45) Date of Patent: Feb. 20, 2024

(54) PARKING ASSISTANCE DEVICE, PARKING ASSISTANCE METHOD, AND PARKING ASSISTANCE PROGRAM (71) Applicant: AISIN CORPORATION, Kariya (JP)

(72) Inventors: Kazuma Iwazawa, Kariya (JP); Hiroki Inagaki, Kariya (JP); Hiroyuki Tachibana, Kariya (JP); Yuichi Mizutani, Kariya (JP); Yusuke Kiyokawa, Kariya (JP); Motokatsu Tomozawa, Kariya (JP); Yoshihiko Kosegaki, Kariya (JP); Akihiro Omura, Kariya (JP)

(73) Assignee: AISIN CORPORATION, Kariya (JP)

( * ) Notice: Subject to any disclaimer, the term of this patent is extended or adjusted under 35 U.S.C. 154(b) by 391 days.

(21) Appl. No.: 17/065,994

(22) Filed: Oct. 8, 2020

(65) Prior Publication Data
US 2021/0107454 A1 Apr. 15, 2021

(30) Foreign Application Priority Data

Oct. 11, 2019 (JP) .................. 2019-188118

(51) Int. Cl.
  *B60W 30/14* (2006.01)
  *B60W 30/00* (2006.01)
  *B60W 40/105* (2012.01)
  *G08G 1/14* (2006.01)

(52) U.S. Cl.
  CPC .......... *B60W 30/00* (2013.01); *B60W 30/143* (2013.01); *B60W 40/105* (2013.01); *G08G 1/143* (2013.01); *B60W 2540/12* (2013.01)

(58) Field of Classification Search
  CPC .. B60W 30/00; B60W 30/143; B60W 40/105; B60W 2540/12; B60W 30/06; B60W 10/04; B60W 10/18; B60W 10/20; B60W 30/08; B60W 40/02; B60W 50/08; G08G 1/143; G08G 1/168; B62D 15/0285; B60R 1/00; B60R 2300/806; B60R 1/10; B60T 7/12; G01S 15/931
  USPC .................................... 701/93, 98, 110, 119
  See application file for complete search history.

(56) References Cited

U.S. PATENT DOCUMENTS 7,660,659 B2 * 2/2010 Watanabe .......... B62D 15/0275
                                                701/96
8,972,142 B2    3/2015 Takagi et al.
11,192,550 B2 * 12/2021 Lindhuber ............ B60W 50/14
(Continued)

FOREIGN PATENT DOCUMENTS

JP    2008-137442 A    6/2008
JP    2012-144158 A    8/2012
(Continued)

*Primary Examiner* — B M M Hannan
(74) *Attorney, Agent, or Firm* — Sughrue Mion, PLLC (57) ABSTRACT A parking assistance device includes: a calculation unit that calculates a target speed with passage of time until a vehicle is moved to a parking target position; an event detection unit that detects an event that is a predetermined event indicating a timing of recalculation of the target speed; and an acquisition unit that acquires a current actual speed of the vehicle. Then, when the event is detected, the calculation unit recalculates the target speed to match the target speed with the current actual speed of the vehicle.

4 Claims, 9 Drawing Sheets

(56) References Cited

U.S. PATENT DOCUMENTS

| | | | |
|---|---|---|---|
| 2002/0041239 A1* | 4/2002 | Shimizu | B60R 1/00 340/932.2 |
| 2007/0027598 A1* | 2/2007 | Mori | B60W 10/184 701/41 |
| 2007/0276574 A1* | 11/2007 | Isaji | B60T 7/22 701/96 |
| 2009/0091475 A1* | 4/2009 | Watanabe | G08G 1/168 701/41 |
| 2009/0132143 A1* | 5/2009 | Kamiya | B60T 7/22 701/96 |
| 2010/0106372 A1* | 4/2010 | Watanabe | B62D 15/0285 701/41 |
| 2013/0282252 A1 | 10/2013 | Takagi et al. | |
| 2014/0244070 A1* | 8/2014 | Inagaki | B62D 15/0285 701/1 |
| 2015/0367845 A1* | 12/2015 | Sannodo | B60W 10/20 701/23 |
| 2015/0375740 A1* | 12/2015 | Okamura | B62D 15/0285 701/25 |
| 2016/0272244 A1* | 9/2016 | Imai | B62D 15/0285 |
| 2017/0120909 A1* | 5/2017 | Oniwa | G05D 1/0212 |
| 2017/0253236 A1* | 9/2017 | Hayakawa | G08G 1/143 |
| 2017/0261326 A1* | 9/2017 | Mizutani | G01P 21/02 |
| 2018/0208245 A1* | 7/2018 | Mizutani | B60W 30/06 |
| 2018/0265079 A1* | 9/2018 | Nakada | G05D 1/0223 |
| 2019/0061740 A1 | 2/2019 | Ohira et al. | |
| 2019/0241177 A1* | 8/2019 | Suzuki | B60W 30/06 |
| 2019/0258269 A1* | 8/2019 | Yanagihara | G05D 1/0223 |
| 2019/0291713 A1* | 9/2019 | Kogure | B60W 10/06 |
| 2020/0062242 A1* | 2/2020 | Hayakawa | B62D 15/028 |
| 2020/0079361 A1* | 3/2020 | Suzuki | B62D 15/0285 |
| 2020/0114917 A1* | 4/2020 | Oguro | B60W 30/181 |
| 2020/0346639 A1* | 11/2020 | Tashiro | G01C 21/34 |
| 2020/0361449 A1* | 11/2020 | Suzuki | B60W 30/06 |
| 2021/0006707 A1* | 1/2021 | Xu | H04N 5/23212 |
| 2021/0291814 A1* | 9/2021 | Shirozono | B60W 50/14 |
| 2021/0323538 A1* | 10/2021 | Takahashi | G08G 1/168 |
| 2021/0354688 A1* | 11/2021 | Tashiro | B60W 30/09 |
| 2021/0387614 A1* | 12/2021 | Tashiro | B60W 10/10 |
| 2022/0089186 A1* | 3/2022 | Gotou | B60W 30/0956 |

FOREIGN PATENT DOCUMENTS

| | | | |
|---|---|---|---|
| JP | 2019-038296 A | 3/2019 | |
| WO | WO-2007013246 A1 * | 2/2007 | B60T 7/12 |

* cited by examiner

PARKING ASSISTANCE DEVICE, PARKING ASSISTANCE METHOD, AND PARKING ASSISTANCE PROGRAM

CROSS REFERENCE TO RELATED APPLICATIONS

This application is based on and claims priority under 35 U.S.C. § 119 to Japanese Patent Application No. 2019-188118, filed on Oct. 11, 2019, the entire content of which is incorporated herein by reference.

TECHNICAL FIELD

Embodiments of the present disclosure relate to a parking assistance device, a parking assistance method, and a parking assistance program.

BACKGROUND DISCUSSION

In JP 2019-38296 A, a parking assistance device is disclosed that accurately moves a vehicle to a target position by calculating a target vehicle speed every cycle.

Even such a parking assistance device disclosed in JP 2019-38296 A enables a vehicle to accurately move to the target position, but needs to further improve its accuracy.

A need thus exists for a parking assistance device, a parking assistance method, and a parking assistance program which are not susceptible to the drawback mentioned above.

SUMMARY

A parking assistance device of an embodiment includes: a calculation unit that calculates a target speed with passage of time until a vehicle is moved to a parking target position; an event detection unit that detects an event that is a predetermined event indicating a timing of recalculation of the target speed; and an acquisition unit that acquires a current actual speed of the vehicle. Then, when the event is detected, the calculation unit recalculates the target speed to match the target speed with the current actual speed of the vehicle.

A parking assistance method of an embodiment includes: a calculation step in which a calculation unit calculates a target speed with passage of time until a vehicle is moved to a parking target position; an event detection step in which an event detection unit detects an event that is a predetermined event indicating a timing of recalculation of the target speed; and an acquisition step in which an acquisition unit acquires a current actual speed of the vehicle. Then, in the calculation step, when the event is detected, the calculation unit recalculates the target speed to match the target speed with the current actual speed of the vehicle.

A parking assistance program of an embodiment causes a computer to function as: a calculation unit that calculates a target speed with passage of time until a vehicle is moved to a parking target position; an event detection unit that detects an event that is a predetermined event indicating a timing of recalculation of the target speed; and an acquisition unit that acquires a current actual speed of the vehicle. Then, when the event is detected, the calculation unit recalculates the target speed to match the target speed with the current actual speed of the vehicle.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating a vehicle to which a parking assistance device of an embodiment is applied in a state where a part of the vehicle is seen through;

DETAILED DESCRIPTION

Hereinafter, a description will be given of a parking assistance device that is an embodiment to which the present disclosure is applied.

(Configuration of Vehicle)

Figure 1:
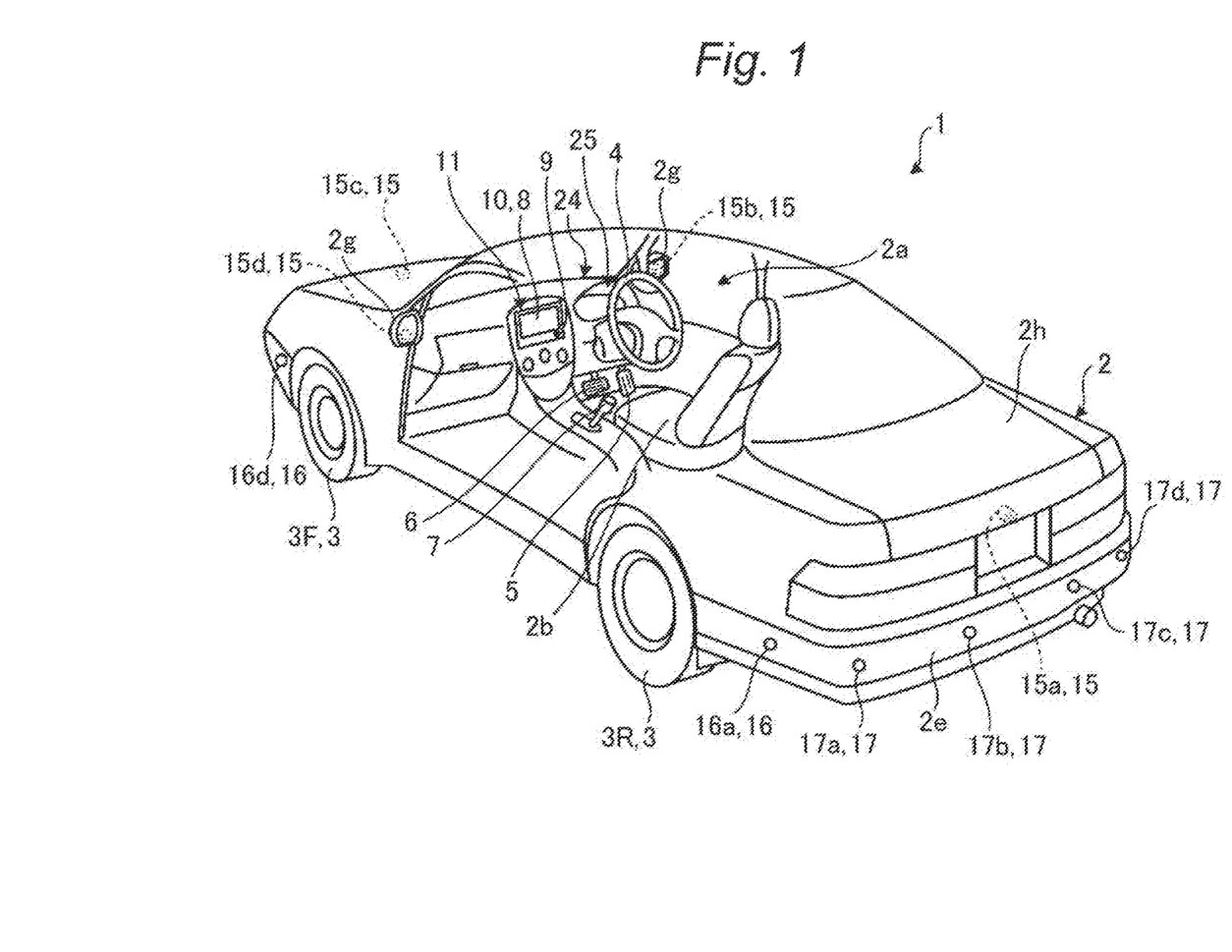
Figure 2:
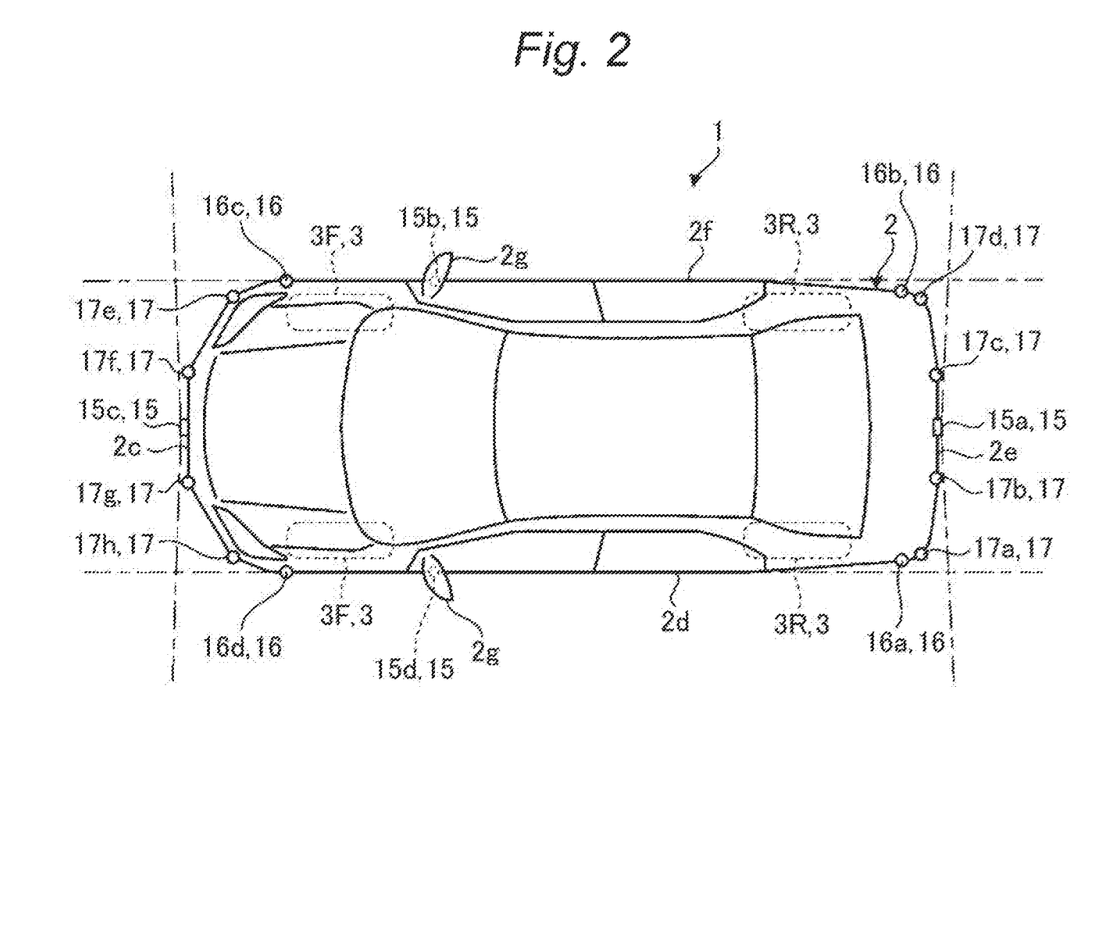
FIG. 2 is a top view of the vehicle to which the parking assistance device of the embodiment is applied.
Figure 3:
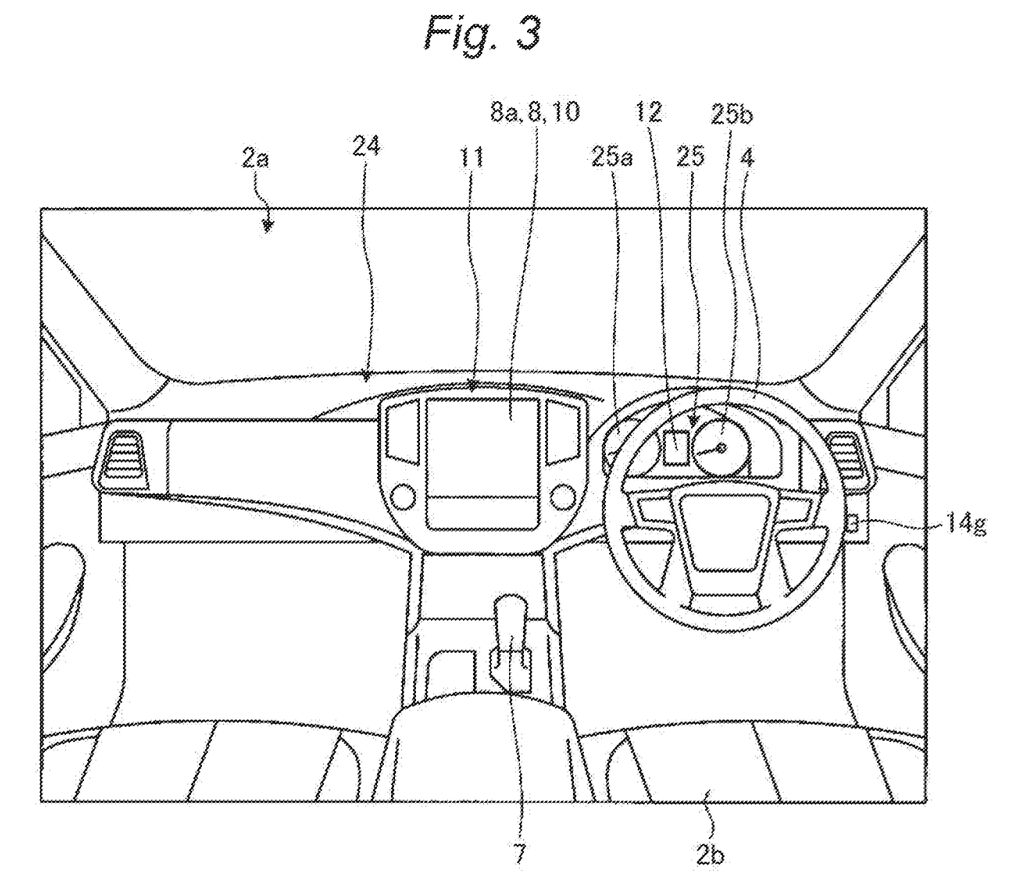
FIG. 3 is a diagram illustrating a dashboard of the vehicle to which the parking assistance device of the embodiment is applied.

First, FIG. 1 is a perspective view illustrating a vehicle to which the parking assistance device of the embodiment is applied in a state where a part of the vehicle is seen through. FIG. 2 is a top view of the vehicle to which the parking assistance device of the embodiment is applied. FIG. 3 is a diagram illustrating a dashboard of the vehicle to which the parking assistance device of the embodiment is applied.

The parking assistance device of the embodiment can be applied to a vehicle 1 as illustrated in FIG. 1, for example. The vehicle 1 may be, for example, an automobile including an internal combustion engine as a drive source (internal combustion engine automobile), an electric automobile including an electric motor as a drive source, a fuel cell automobile, or the like. The vehicle 1 may be a hybrid automobile including both an internal combustion engine and an electric motor as drive sources, or an automobile including another drive source. The vehicle 1 may include various transmissions, or may include various devices, for example, a system, a component, or the like necessary for driving an internal combustion engine or an electric motor. A method, number, layout, and the like of the devices for driving wheels 3 of the vehicle 1 can be set in various ways.

Such a vehicle 1 is provided with a passenger compartment 2a in which an occupant gets, in a vehicle body 2. In the passenger compartment 2a, a steering unit 4, an acceleration operation unit 5, a braking operation unit 6, a shift operation unit 7, and the like are provided at positions where a driver can operate the units while seated in a driver's seat 2b. The steering unit 4 is, for example, a steering wheel protruding from a dashboard 24. The acceleration operation unit 5 is an accelerator pedal positioned at driver's feet. The braking operation unit 6 is a brake pedal positioned at the driver's feet. The shift operation unit 7 is, for example, a shift lever protruding from a center console. Note that, positions and the like of the steering unit 4, the acceleration operation unit 5, the braking operation unit 6, the shift operation unit 7, and the like are not limited to these.

In the passenger compartment 2a, a display device 8 as a display output unit and an audio output device 9 as an audio output unit are provided. The display device 8 is, for example, a Liquid Crystal Display (LCD), an Organic Electroluminescent Display (OELD), or the like. The audio output device 9 is, for example, a speaker. The display device 8 is covered with a transparent operation input unit 10 such as a touch panel. The occupant can visually recognize an image displayed on a display screen of the display device 8 via the operation input unit 10. The occupant can perform operation input via the operation input unit 10 by touching and operating a position corresponding to the image displayed on the display screen of the display device 8 with a finger or the like.

These display device 8, audio output device 9, operation input unit 10, and the like are provided in, for example, a monitor device 11 positioned at a central portion in the vehicle width direction (left-right direction) of the dashboard 24. The monitor device 11 includes operation input units such as a switch, a dial, a joystick, and a push button. Furthermore, an audio output device different from the monitor device 11 may be provided at another position in the passenger compartment 2a, or audio may be output from both the audio output device 9 of the monitor device 11 and the other audio output device. Note that, the monitor device 11 can also be used as, for example, a navigation system or an audio system.

As illustrated in FIG. 3, a display device 12 different from the display device 8 is provided in the passenger compartment 2a. The display device 12 is provided, for example, on an instrument panel unit 25 of the dashboard 24. Specifically, the display device 12 is provided to be positioned substantially at the center of the instrument panel unit 25, between a speed display unit 25a and an engine speed display unit 25b.

A size of a screen 12a of the display device 12 is smaller than a size of a screen 8a of the display device 8. The display device 12 mainly displays an image indicating information regarding parking assistance for the vehicle 1. An amount of information displayed on the display device 12 may be less than an amount of information displayed on the display device 8. The display device 12 is, for example, an LCD or an OELD. Note that, the information displayed on the display device 12 may be displayed on the display device 8.

As illustrated in FIGS. 1 and 2, the vehicle 1 is, for example, a four-wheeled automobile, and includes two front wheels 3F on the left and right and two rear wheels 3R on the left and right. All of these four wheels 3 are configured to be steerable.

(Hardware Configuration of Parking Assistance Device)

Figure 4:
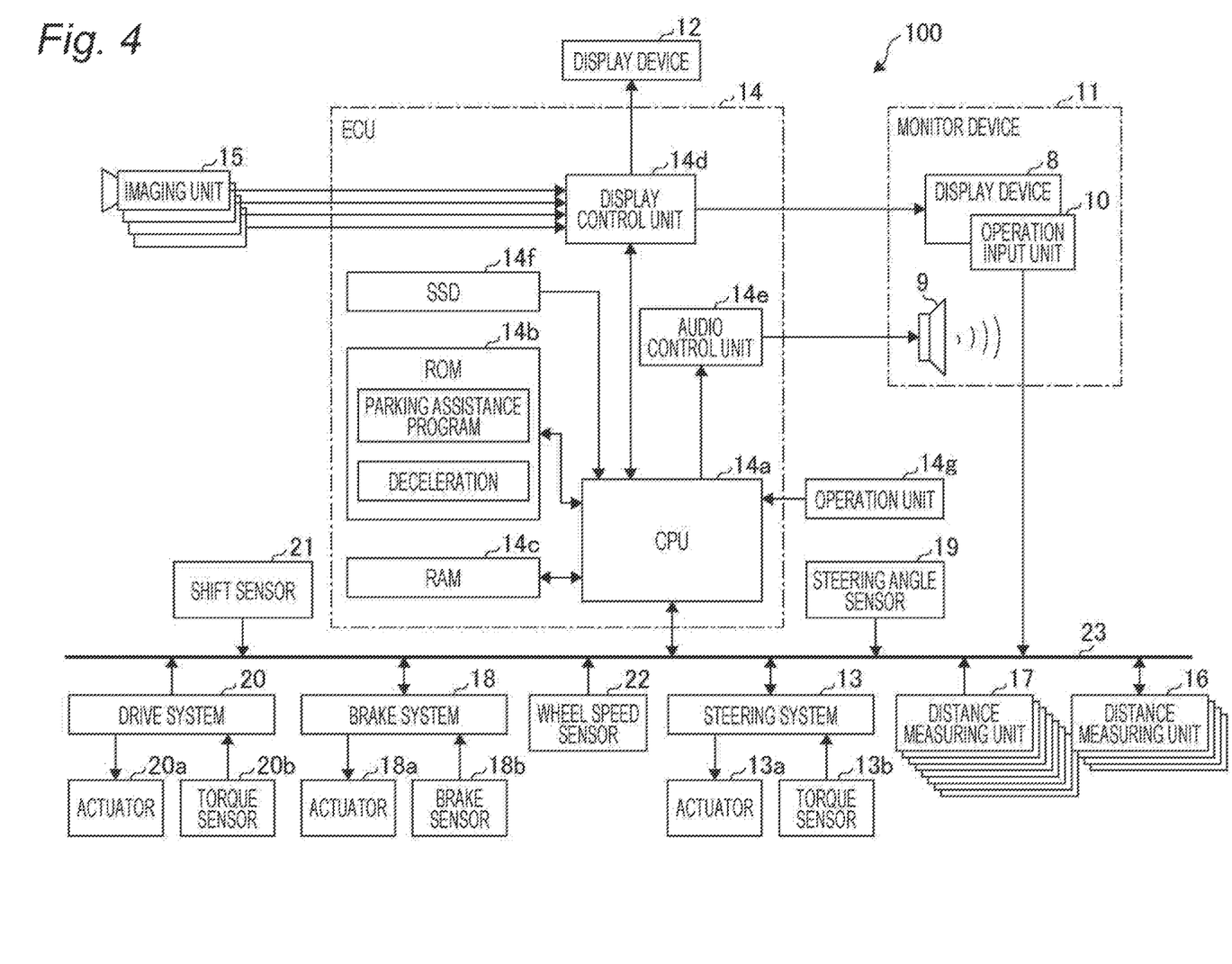
FIG. 4 is a block diagram of the parking assistance device of the embodiment.

FIG. 4 is a block diagram of a parking assistance device 100 of the embodiment. As illustrated in FIG. 4, the vehicle 1 includes a steering system 13 that steers at least two of the wheels 3. The steering system 13 includes an actuator 13a and a torque sensor 13b. The steering system 13 operates the actuator 13a by electrical control of an Electronic Control Unit (ECU) 14 or the like. The steering system 13 is, for example, an electric power steering system, a Steer By Wire (SBW) system, or the like. The steering system 13 assists steering force by applying an assist torque to the steering unit 4 by the actuator 13a, and also steers the wheels 3 by the actuator 13a. In this case, the actuator 13a may steer one of the wheels 3, or may steer a plurality of the wheels 3. The torque sensor 13b detects, for example, torque given to the steering unit 4 by the driver.

As illustrated in FIG. 2, the vehicle body 2 is provided with, for example, four imaging units 15a to 15d as a plurality of imaging units 15. Each of the imaging units 15 is, for example, a digital camera device including an imaging element such as a Charge Coupled Device (CCD) or a CMOS Image Sensor (CIS). The imaging unit 15 outputs moving image data at a predetermined frame rate. The imaging unit 15 includes a wide-angle lens or a fisheye lens capable of imaging in a range of, for example, 140° to 190° in the horizontal direction. Furthermore, the optical axis of the imaging unit 15 is set obliquely downward. As a result, the imaging unit 15 sequentially images an external environment around the vehicle body 2 including a road surface on which the vehicle 1 can move and an area where the vehicle 1 can be parked, and outputs the imaged external environment as captured image data.

The imaging unit 15a is provided on a wall portion below a rear trunk door 2h to be positioned at a rear end 2e of the vehicle body 2, for example. The imaging unit 15b is provided on a right door mirror 2g to be positioned at a right end 2f of the vehicle body 2, for example. The imaging unit 15c is provided on a front bumper or the like to be positioned at a front end 2c of the vehicle 2, for example. The imaging unit 15d is provided on a door mirror 2g as a left protruding portion to be positioned at a left end 2d in the vehicle width direction of the vehicle body 2, for example.

The ECU 14 executes calculation processing and image processing on the basis of the image data obtained by the plurality of imaging units 15 to generate an image having a wider viewing angle, or generate a virtual bird's-eye image (planar image) of the vehicle 1 as viewed from above. Furthermore, the ECU 14 identifies a section line and the like indicated on a road surface around the vehicle 1 from the image of the imaging units 15, and detects (extracts) a parking section indicated by the section line and the like.

As illustrated in FIGS. 1 and 2, the vehicle body 2 is provided with, for example, four distance measuring units 16a to 16d and eight distance measuring units 17a to 17h as a plurality of distance measuring units 16 and 17. The distance measuring units 16 and 17 each are, for example, a sonar device that emits ultrasonic waves and capture reflected waves of the ultrasonic waves. The sonar device may also be referred to as a sonar sensor or an ultrasonic detector. The ECU 14 measures presence or absence of an object such as an obstacle positioned around the vehicle 1 and a distance to the object on the basis of detection results of the distance measuring units 16 and 17. Note that, the distance measuring units 17 are used for detection of a relatively short-distance object, and the distance measuring units 16 are used for detection of a relatively long-distance object farther than the object to be detected by the distance measuring units 17. Furthermore, the distance measuring units 17 are used for detection of objects in front of and behind the vehicle 1, for example, and the distance measuring units 16 are used for detection of objects on the sides of the vehicle 1.

As illustrated in FIG. 4, the parking assistance device 100 includes the ECU 14, the monitor device 11, the steering system 13, the distance measuring units 16 and 17, a brake system 18, a steering angle sensor 19, an accelerator sensor 20, and a shift sensor. 21, a wheel speed sensor 22, and the like that are electrically connected to each other via an in-vehicle network 23 as an electric telecommunications line. The in-vehicle network 23 is configured as, for example, a Controller Area Network (CAN).

The ECU 14 controls the steering system 13, the brake system 18, or the like by transmitting a control signal via the in-vehicle network 23. Furthermore, the ECU 14 acquires, via the in-vehicle network 23, detection results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and an operation signal and the like of the operation input unit 10 and the like.

The ECU 14 includes, for example, a Central Processing Unit (CPU) 14a, a Read Only Memory (ROM) 14b, a Random Access Memory (RAM) 14c, a display control unit 14d, an audio control unit 14e, a Solid State Drive (SSD) (flash memory) 14f, and the like. The CPU 14a executes various types of calculation processing and control such as image processing related to images displayed on the display devices 8 and 12, determination of a target position of the vehicle 1, calculation of an movement route of the vehicle 1, determination of presence or absence of interference with an object, automatic control of the vehicle 1, and cancellation of the automatic control.

The CPU 14a reads a program installed and stored in a non-volatile storage device such as the ROM 14b, and executes the calculation processing in accordance with the program. Specifically, the ROM 14b stores a parking assistance program for performing parking assistance operation described later, and deceleration data for adjusting a moving speed of the vehicle 1 during parking assistance. The CPU 14a performs the parking assistance by operating on the basis of the parking assistance program and the deceleration data.

The RAM 14c temporarily stores various data used in calculation by the CPU 14a. The display control unit 14d mainly executes image processing using the image data obtained by the imaging units 15 and synthesis of the image data to be displayed by the display device 8, among the pieces of calculation processing in the ECU 14. The audio control unit 14e mainly executes processing of audio data output by the audio output device 9, among the pieces of calculation processing of the ECU 14. The SSD 14f is a rewritable non-volatile storage unit, and continuously stores data even when a power supply of the ECU 14 is turned off.

Note that, the CPU 14a, the ROM 14b, the RAM 14c, and the like may be integrated in the same package. The ECU 14 may use another logic operation processor such as a Digital Signal Processor (DSP) or a logic circuit instead of the CPU 14a. A Hard Disk Drive (HDD) may be provided instead of the SSD 14f, or the SSD 14f or the HDD may be provided separately from the ECU 14.

The brake system 18 is, for example, an Anti-Lock Brake System (ABS) that suppresses brake lock, an Electronic Stability Control (ESC) that suppresses sideslip of the vehicle 1 during cornering, an electric brake system that enhances braking force (executes brake assist), a Brake By Wire (BBW), or the like.

The brake system 18 brakes the vehicle 1 by an actuator 18a via the wheels 3. Furthermore, the brake system 18 detects brake lock, idling of the wheels 3, a sign of sideslip, and the like from a rotation difference between the left and right wheels 3, and executes various types of control. The brake sensor 18b is, for example, a sensor that detects a position of a movable portion of the braking operation unit 6. The brake sensor 18b detects a position of the brake pedal as the movable portion. The brake sensor 18b includes a displacement sensor.

The steering angle sensor 19 is a sensor that detects an amount of steering of the steering unit 4 such as the steering wheel. The steering angle sensor 19 is configured by using, for example, a Hall element or the like. The ECU 14 acquires an amount of steering of the steering unit 4 by the driver, an amount of steering of each of the wheels 3 during automatic steering, and the like from the steering angle sensor 19, and executes various types of control. Note that, the steering angle sensor 19 detects a rotation angle of a rotating portion included in the steering unit 4.

The accelerator sensor 20 is, for example, a sensor that detects a position of a movable portion of the acceleration operation unit 5, and the accelerator sensor 20 detects a position of the accelerator pedal as the movable portion. The accelerator sensor 20 includes a displacement sensor.

The shift sensor 21 is, for example, a sensor that detects a position of a movable portion of the shift operation unit 7. The shift sensor 21 detects the position of the movable portion such as a lever, an arm, or a button. The shift sensor 21 may include a displacement sensor, or may be configured as a switch.

The wheel speed sensor 22 is a sensor that detects an amount of rotation of the wheel 3 or the number of revolutions per unit time. The wheel speed sensor 22 outputs the number of wheel speed pulses indicating the detected number of revolutions as a sensor value. The wheel speed sensor 22 is configured by using, for example, a Hall element or the like. The ECU 14 calculates an amount of movement of the vehicle 1 on the basis of the sensor value acquired from the wheel speed sensor 22, and executes various types of control. Note that, the wheel speed sensor 22 may be provided in the brake system 18. In this case, the ECU 14 acquires a detection result of the wheel speed sensor 22 via the brake system 18.

Note that, configurations, arrangements, electrical connection forms, and the like of the various sensors and actuators described above are examples, and can be arbitrarily set and changed.

(Functional Configuration of Parking Assistance Device)

Figure 5:
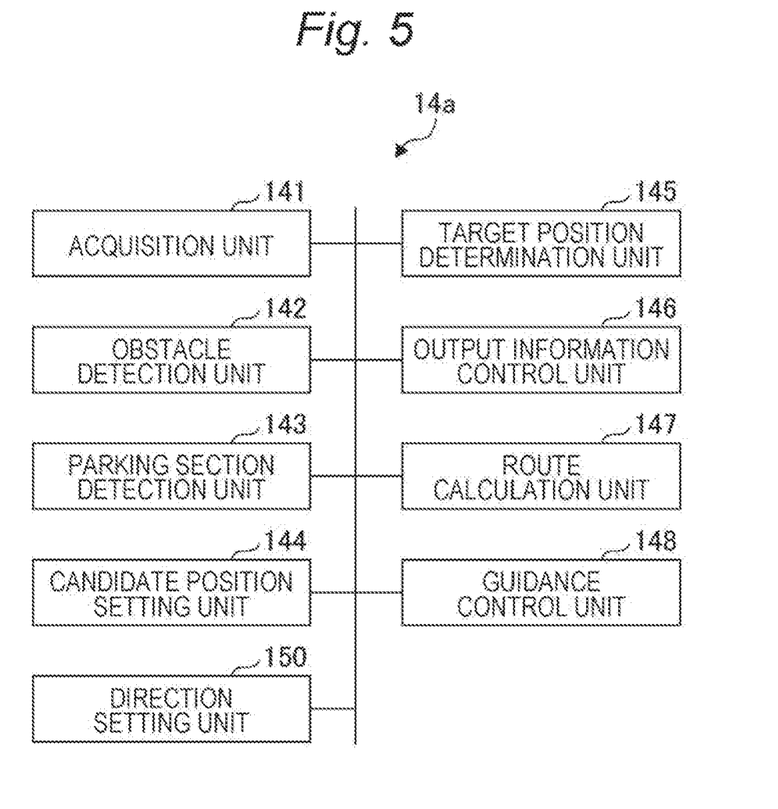
FIG. 5 is a functional block diagram of the parking assistance device of the embodiment.

Next, FIG. 5 illustrates a functional block diagram of functions implemented by the CPU 14a executing the parking assistance program stored in the ROM 14b. As illustrated in FIG. 5, the CPU 14a executes the parking assistance program, thereby functioning as an acquisition unit 141, an obstacle detection unit 142, a parking section detection unit 143, a candidate position setting unit 144, a target position determination unit 145, an output information control unit 146, a route calculation unit 147, a guidance control unit 148, and a direction setting unit 150. Note that, in addition to the parking assistance program, the ROM 14b stores the deceleration data and the like used in the calculation processing for the parking assistance.

The acquisition unit 141 acquires various data, signals, and the like. The acquisition unit 141 acquires data or signals such as detection results of the sensors, operation inputs, instruction inputs, and image data. The acquisition unit 141 acquires a signal based on the operation input of an operation unit 14g that is, for example, a push button or a switch. The acquisition unit 141 acquires an actual speed of the vehicle 1 calculated by the ECU 14 or the like on the basis of the sensor value of the wheel speed sensor 22, or the like.

The obstacle detection unit 142 detects an obstacle that hinders traveling of the vehicle 1. The obstacle is, for example, another vehicle, a wall, a pillar, a fence, a protrusion, a level difference, a wheel stop, an object, or the like. The obstacle detection unit 142 detects the presence or absence, height, size, and the like of the obstacle by various methods. The obstacle detection unit 142 detects the obstacle on the basis of, for example, the detection results of the distance measuring units 16 and 17. The distance measuring units 16 and 17 detect an object corresponding to the height of the beam. The obstacle detection unit 142 detects the presence or absence and height of the obstacle on the basis of the detection results of the wheel speed sensor 22 and an acceleration sensor and the detection results of the distance measuring units 16 and 17. The obstacle detection unit 142 may detect the height of the obstacle on the basis of the image captured by the imaging unit 15.

The parking section detection unit 143 detects a parking section provided as a sign or an object. The parking section is a section that is a guideline or reference set so that the vehicle 1 is parked at the place. A parking boundary is a boundary or an outer edge of the parking section, and is, for example, a section line, a frame border, a straight line, a band, a level difference, or an edge thereof. The parking section detection unit 143 detects the parking section and the parking boundary by, for example, performing image processing on the image captured by the imaging unit 15.

The candidate position setting unit 144 sets at least one candidate position as a candidate for a target position (=end point position) of the movement route of the vehicle 1. The candidate position setting unit 144 sets the candidate position on the basis of at least one of a detection result by the obstacle detection unit 142 or a detection result of the parking section detection unit 143.

The direction setting unit 150 sets a direction of the vehicle 1 at each candidate position. The direction setting unit 150 sets the direction of the vehicle 1 at the candidate position on the basis of at least one of the detection result by the obstacle detection unit 142 or the detection result of the parking section detection unit 143. When the parking section is detected, the direction setting unit 150 sets the direction of the vehicle 1 on the basis of the parking section.

The target position determination unit 145 determines the target position from the at least one candidate position. The target position determination unit 145 determines a candidate position having a higher rank (higher-ranked candidate position) as the target position from the at least one candidate position ranked on the basis of a predetermined condition. The target position determination unit 145 determines a candidate position selected by the operation input of the occupant as the target position from the at least one candidate position.

The output information control unit 146 controls the display devices 8 and 12 or the audio output device 9 via the display control unit 14*d* and the audio control unit 14*e* so that predetermined information is output in a predetermined mode, at each stage of start and end of the parking assistance, determination of the target position, route calculation, guidance control, or the like.

The route calculation unit 147 is an example of the calculation unit and the event detection unit, and calculates a movement route and target speed from a current position of the vehicle 1 to the target position on the basis of the current position of the vehicle 1, the determined target position, the detection result of the obstacle, and the like. The route calculation unit 147 detects a predetermined event described later, and when the event is detected, recalculates the target speed on the basis of the actual speed of the vehicle 1.

The guidance control unit 148 controls each unit so that movement of the vehicle 1 along the calculated movement route is implemented. When the vehicle 1 is a vehicle that moves due to a creep phenomenon during non-operation of the accelerator pedal, the guidance control unit 148 moves the vehicle 1 along the movement route by controlling the steering system 13 depending on a position of the vehicle 1. In addition to the steering system 13, the guidance control unit 148 may control a drive mechanism such as an engine or a motor, the brake system 18 as a braking mechanism, and the like. The guidance control unit 148 may guide the driver to move the vehicle 1 along the movement route by a display output or an audio output depending on the position of the vehicle 1 by controlling the display devices 8 and 12 or the audio output device 9 via the output information control unit 146, the display control unit 14*d*, and the audio control unit 14*e*.

(Parking Assistance Operation)

Figure 6:
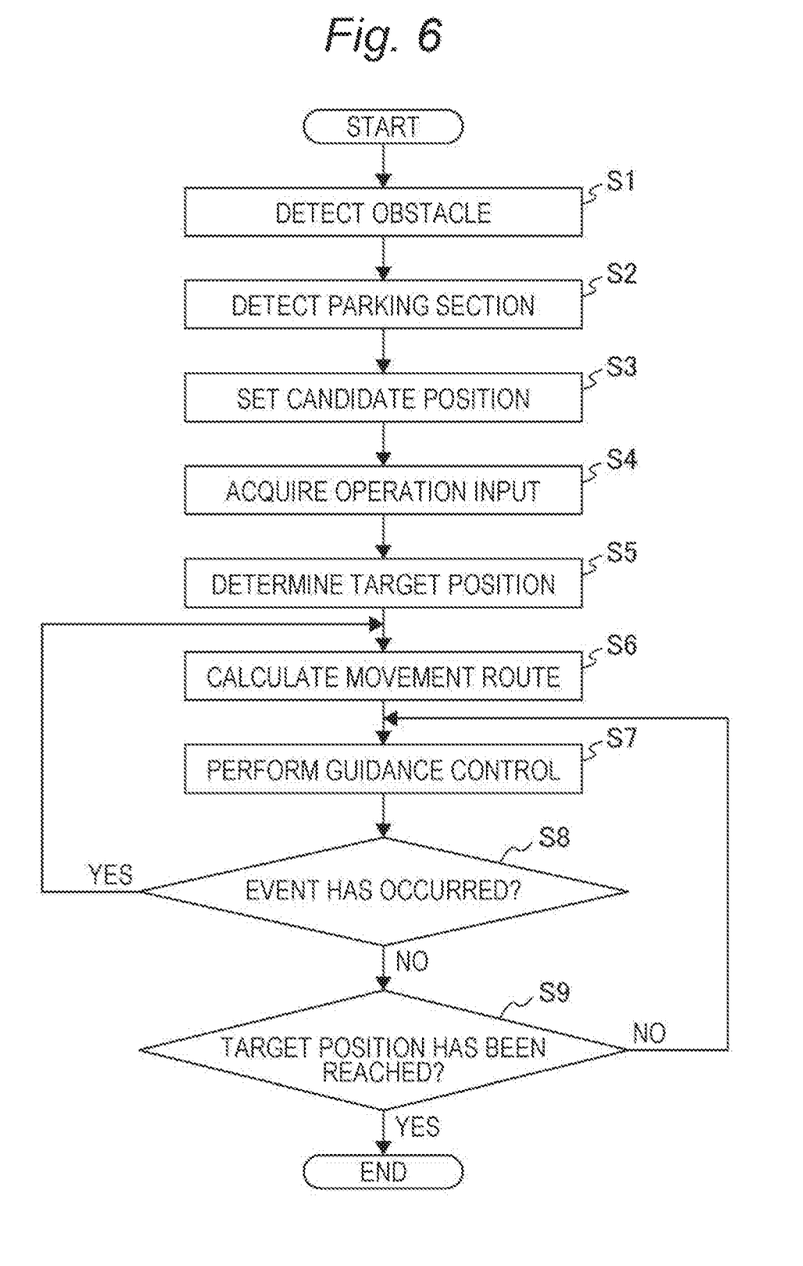
FIG. 6 is a flowchart illustrating a flow of parking assistance operation of the parking assistance device of the embodiment.

Next, a description will be given of the parking assistance operation in the parking assistance device 100 of the embodiment with reference to a flowchart of FIG. 6. In the flowchart of FIG. 6, first, the obstacle detection unit 142 detects an obstacle (step S1). Next, the parking section detection unit 143 detects a parking section and a parking boundary (step S2). Next, the candidate position setting unit 144 sets at least one candidate position as a candidate for a target position (end point position) of a movement route of the vehicle 1 on the basis of detection results of step S1 and step S2 (step S3).

Next, the acquisition unit 141 acquires an operation input giving an instruction for starting parking assistance (step S4). That is, in the case of the parking assistance device of the embodiment, each processing step of step S1 to step S3 is executed before an operation instruction is input.

Next, the target position determination unit 145 determines the target position from the at least one candidate position (step S5). Specifically, in step S5, the target position determination unit 145 ranks each candidate position detected, and determines a candidate position having the highest rank as the target position. Note that, the target position determination unit 145 may determine a candidate position selected by the operation input of the occupant as the target position.

Next, the route calculation unit 147 calculates a movement route from a current position of the vehicle 1 to the determined target position (step S6). Next, the guidance control unit 148 controls each unit so that the vehicle 1 moves along the calculated movement route (step S7). Next, the route calculation unit 147 detects presence or absence of occurrence of an event described later during movement of the vehicle 1 along the movement route (step S8).

When the event has occurred (step S8: Yes), the processing returns to step S6, and the route calculation unit 147 recalculates the target speed in consideration of an actual speed of the vehicle 1. On the other hand, when no event has occurred (step S8: No), the guidance control unit 148 continues movement control of the vehicle 1 along the calculated movement route. Next, in step S9, the guidance control unit 148 determines whether or not the vehicle 1 has reached the target position of the parking section. When the vehicle 1 has not reached the target position of the parking section (step S9: No), the processing returns to step S7, and the guidance control unit 148 continues the movement control of the vehicle 1. When the vehicle 1 reaches the target position of the parking section (step S9: Yes), the parking assistance operation illustrated in the flowchart of FIG. 6 ends.

(Recalculation Operation when Event Occurs)

Figure 7A:
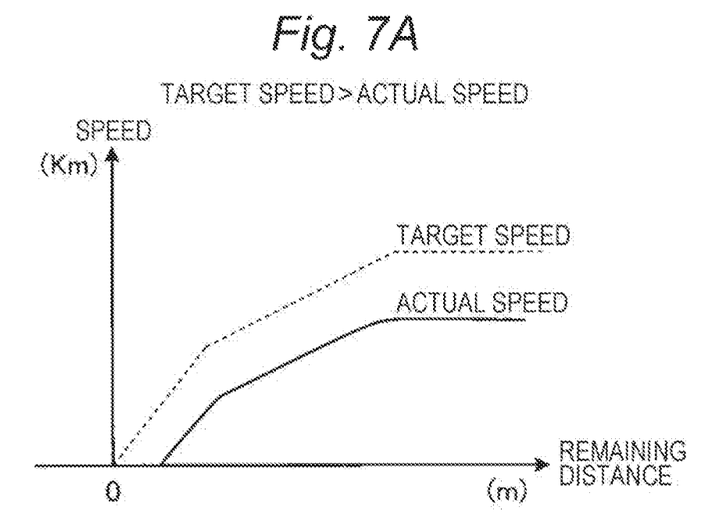
FIGS. 7A and 7B are graphs for explaining an inconvenience of overrunning from a target position or being short to the target position by performing parking assistance calculation without using an actual speed, in parking assistance.
Figure 7B:
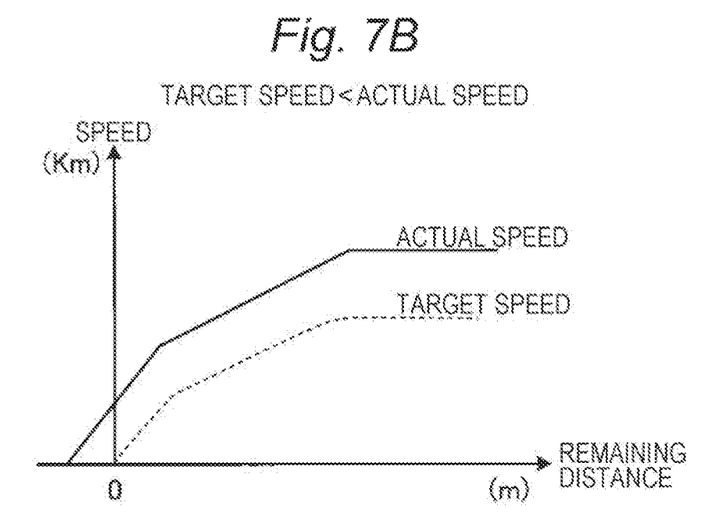

Here, a description will be given of the recalculation operation of the target speed when the event occurs in step S8. First, FIGS. 7A and 7B are graphs of control accuracy of a parking assistance device as a comparative example. The solid line graph is a graph of the actual speed of the vehicle, and the dotted line graph is a graph of the target speed. FIG. 7A is a graph when control is performed in which the actual speed is below the target speed, and FIG. 7B is a graph when control is performed in which the actual speed is above the target speed.

As illustrated in FIG. 7A, when the control is performed in which the actual speed is below the target speed, the actual speed is 0 km (stopped state) before the vehicle 1 reaches the target position (position at which a remaining distance is 0 m). That is, an inconvenience occurs that the parking assistance operation ends before the target position (short run). On the contrary, as illustrated in FIG. 7B, when the control is performed in which the actual speed is above the target speed, the actual speed is 0 km (stopped state) at a position where the vehicle 1 has passed the target position (position at which a remaining distance is 0 m). That is, an inconvenience occurs that the parking assistance operation ends at a position past the target position (overrun).

From the fact as described above, it can be seen that a problem occurs in the control accuracy when the target speed is calculated without considering the actual speed. Calculation of the target speed may be performed periodically at predetermined time intervals, but in this case, there is a concern that a load on the CPU is increased by repeating the calculation periodically.

In the case of the parking assistance device 100 of the embodiment, the route calculation unit 147 acquires the actual speed that is a current speed of the vehicle 1 via the acquisition unit 141 and recalculates the target speed, for each predetermined event. Specifically, prior to the parking assistance operation, the route calculation unit 147 calculates a distance required until the vehicle 1 stops on the basis of a deceleration specified in advance that is described later with reference to FIG. 9, and a current actual speed and actual acceleration. The guidance control unit 148 performs the movement control of the vehicle 1 on the basis of the distance required.

Here, immediately after the parking assistance operation is started and the vehicle 1 starts moving, the traveling speed is often unstable. For this reason, when it is notified from, for example, the distance measuring units 16 and 17 that the vehicle 1 has traveled a predetermined distance after the vehicle 1 has started moving, the route calculation unit 147 recognizes that as an event occurrence, and recalculates the target speed, target position, and target acceleration on the basis of the actual speed, actual position, actual acceleration, remaining distance, and the like of the vehicle.

Due to that the vehicle 1 is subjected to the movement control by the guidance control unit 148, when the remaining distance is less than the distance that is required until the vehicle 1 stops and that is calculated first, the route calculation unit 147 recognizes that as an event occurrence, and recalculates the target speed, target position, and target acceleration on the basis of the actual speed, actual position, actual acceleration, remaining distance, and the like of the vehicle.

The fact that a user applies a brake means that some kind of anxiety factor has occurred such as an obstacle. For this reason, when the brake system 18 detects that the user has applied the brake, the route calculation unit 147 recognizes that as an event occurrence, and recalculates the target speed, target position, and target acceleration on the basis of the actual speed, actual position, actual acceleration, remaining distance, and the like of the vehicle.

Moreover, when the target position of the vehicle 1 is updated, the route calculation unit 147 recognizes that as an event occurrence, and recalculates the target speed, target position, and target acceleration on the basis of the actual speed, actual position, actual acceleration, remaining distance, and the like of the vehicle. That is, when the event occurs, the route calculation unit 147 performs calculation to match the actual speed with the target speed.

The timing of recognition of such an event can be summarized as follows.

1. The event occurrence is recognized when the parking assistance operation is started and the vehicle is moved by a predetermined distance
2. The event occurrence is recognized when the remaining distance is less than the distance that is required until the vehicle 1 stops and that is calculated first
3. The event occurrence is recognized when the user applies the brake
4. The event occurrence is recognized when the target position of the vehicle 1 is updated Note that, the above-described four events are merely examples, and it is only required to recognize, as the "event", any event that requires recalculation of the target speed or target position, for example.

Figure 8A:
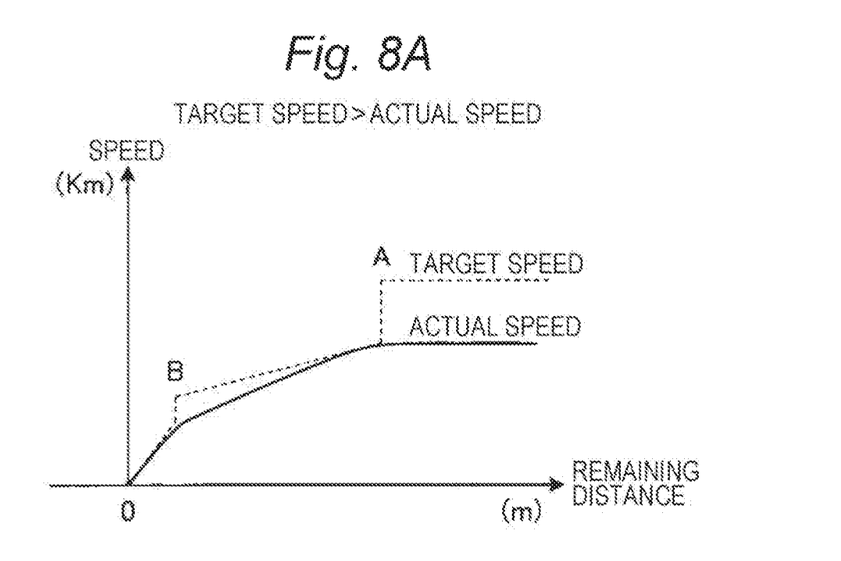
FIGS. 8A and 8B are graphs for explaining that the vehicle is guided to the target position by the parking assistance calculation using the actual speed by the parking assistance device of the embodiment.
Figure 8B:
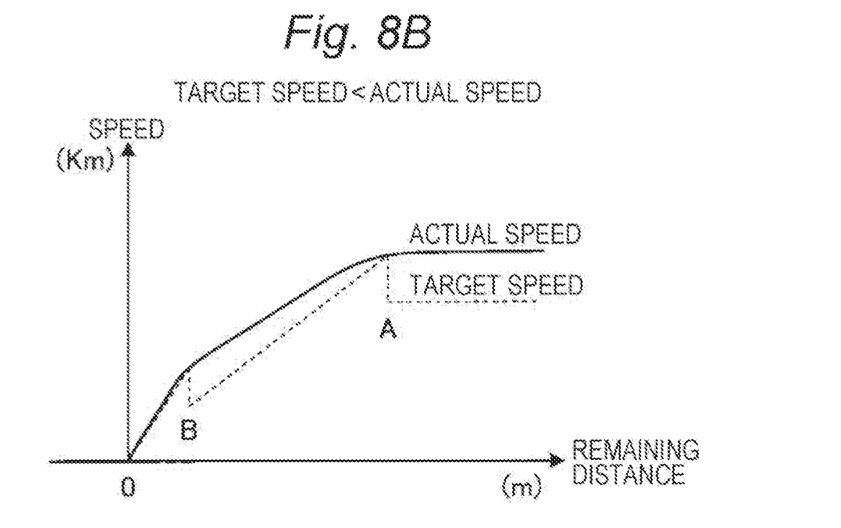

FIGS. 8A and 8B are graphs showing transition of the target speed and the actual speed when the target speed and the target position are recalculated for each of the above-described events in consideration of the actual speed and then the parking assistance is performed. The dotted line graph is a graph of the target speed, and the solid line graph is a graph of the actual speed. FIG. 8A is a graph when the actual speed is below the target speed, and FIG. 8B is a graph when the actual speed is above the target speed. Moreover, the timing of "A" and the timing of "B" in FIGS. 8A and 8B each indicate the timing of the event occurrence.

As illustrated in FIG. 8A, when the event occurs at the timing of "A" in a case where the actual speed is below the target speed, the route calculation unit 147 recalculates the target speed, target position, and target acceleration on the basis of the actual speed, actual position, actual acceleration, remaining distance, and the like of the vehicle. As a result, as illustrated in FIG. 8A, the target speed can be matched with the actual speed, and the movement control of the vehicle 1 is performed in this state.

Similarly, in FIG. 8A, when the event occurs at the timing of "B", the route calculation unit 147 recalculates the target speed, target position, and target acceleration on the basis of the actual speed, actual position, actual acceleration, remaining distance, and the like of the vehicle. As a result, as illustrated in FIG. 8A, the target speed can be matched with the actual speed, and the movement control of the vehicle 1 is performed in this state.

As illustrated in FIG. 8B, when the event occurs at the timing of "A" in a case where the actual speed is above the target speed, the route calculation unit 147 recalculates the target speed, target position, and target acceleration on the basis of the actual speed, actual position, actual acceleration, remaining distance, and the like of the vehicle. As a result, as illustrated in FIG. 8B, the target speed can be matched with the actual speed, and the movement control of the vehicle 1 is performed in this state.

Similarly, in FIG. 8B, when the event occurs at the timing of "B", the route calculation unit 147 recalculates the target speed, target position, and target acceleration on the basis of the actual speed, actual position, actual acceleration, remaining distance, and the like of the vehicle. As a result, as illustrated in FIG. 8B, the target speed can be matched with the actual speed, and the movement control of the vehicle 1 is performed in this state.

Calculation is performed to match the target speed with the actual speed for each event occurrence as described above, and the movement control of the vehicle 1 is performed on the basis of the calculation result, whereby the actual speed of the vehicle can be 0 km when the remaining distance is 0 m as illustrated in FIGS. 8A and 8B. That is, the vehicle 1 can be stopped accurately at the target position.

(Deceleration)

Figure 9:
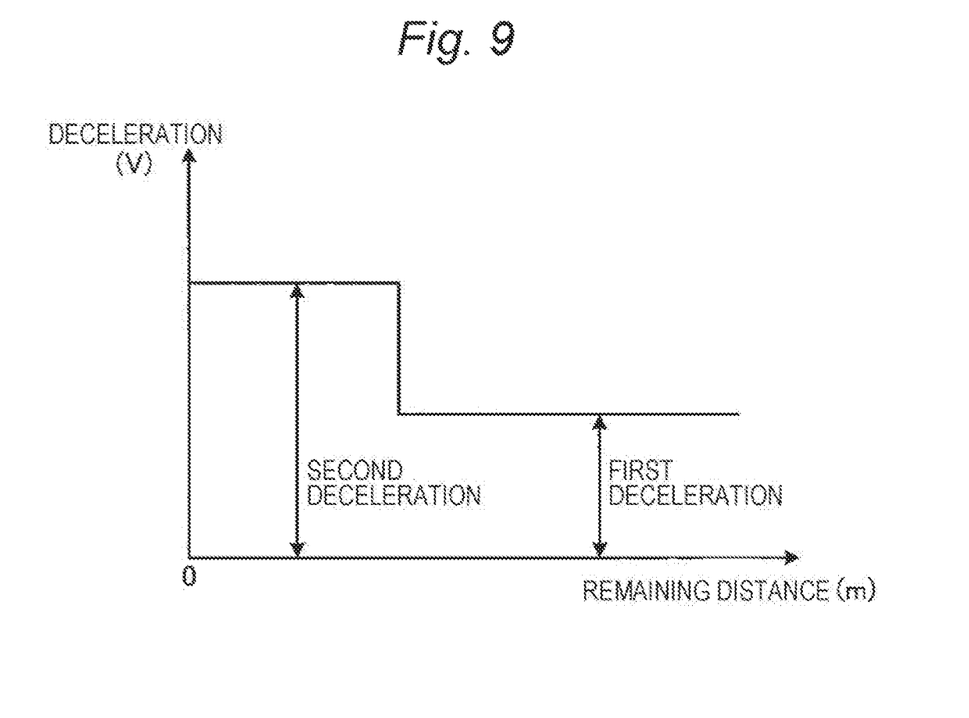
FIG. 9 is a diagram for explaining a deceleration used by the parking assistance device of the embodiment in the parking assistance calculation.

Here, the route calculation unit 147 uses a deceleration depending on the remaining distance when recalculating the target speed, the target position, and the like. FIG. 9 is a diagram illustrating an example of the deceleration. In the example of FIG. 9, it is illustrated that a first deceleration having a small deceleration is used for calculation when the remaining distance is greater than or equal to a predetermined distance, and a second deceleration having a large deceleration is used for calculation when the remaining distance is less than the predetermined distance. Each data of such first deceleration and second deceleration is stored in the ROM 14b illustrated in FIG. 4. The route calculation unit 147 reads deceleration data corresponding to the remaining distance from the ROM 14b and uses the deceleration data for recalculation of the target speed and the like.

As a result, when the remaining distance of a long distance remains, it is possible to shorten the time required for parking by performing the movement control of the vehicle 1 without decelerating so much, and when the remaining distance is short, it is possible to ensure safety by decelerating largely and performing the movement control of the vehicle.

Note that, in this example, a total of two decelerations, a first deceleration and a second deceleration, are used, but three or more decelerations may be used. In this case, more delicate deceleration control can be performed.

Effects of Embodiment

As is clear from the above description, the parking assistance device of the embodiment performs calculation in consideration of the current actual vehicle speed when recalculating the target vehicle speed. For that reason, even if the target vehicle speed and the actual vehicle speed deviate from each other largely, the target vehicle speed can be calculated from the current actual vehicle speed toward the stop position, so that the stop position can be controlled accurately.

The recalculation is performed only when the event occurs, not every predetermined cycle, so that a processing load of the CPU 14a can be reduced, and parking assistance control can be executed even when a CPU is used that is inexpensive and has a slow processing speed.

Modification

The above-described embodiment is an example and is not intended to limit the scope of the disclosure. The above-described embodiment can be implemented in various other forms, and various omissions, replacements, combinations, and changes can be made without departing from the gist of the disclosure. The configuration and shape of each example can be partially replaced and implemented. Specifications (structure, type, direction, shape, size, length, width, height, number, arrangement, position, etc.) of each configuration, shape, and the like can be appropriately changed and implemented. The present disclosure is also applicable to parking assistance in various forms of parking lots and parking spaces. It is possible to variously set or change a detection method, a setting method, their criteria, and the like of the position and direction of the vehicle, and the candidate position and the direction thereof. An input signal may be based on an audio input to a microphone.

The configuration of the above-described embodiment, functions, results, and effects brought about by the configuration are examples. The present disclosure can be implemented by a configuration other than the configuration described in the above-described embodiment, and it is possible to obtain at least one of various effects or derivative effects based on the basic configuration.

A parking assistance device of an embodiment includes: a calculation unit that calculates a target speed with passage of time until a vehicle is moved to a parking target position; an event detection unit that detects an event that is a predetermined event indicating a timing of recalculation of the target speed; and an acquisition unit that acquires a current actual speed of the vehicle. Then, when the event is detected, the calculation unit recalculates the target speed to match the target speed with the current actual speed of the vehicle. In this way, by performing calculation in consideration of a current actual vehicle speed when recalculating the target speed, a target vehicle speed can be calculated toward a stop position from the current actual vehicle speed even if the target vehicle speed and the actual vehicle speed largely deviate from each other, so that the stop position can be controlled accurately. Furthermore, recalculation is performed only when the event occurs, not every predetermined cycle, so that a processing load of the calculation unit can be reduced, and parking assistance control can be executed even when a calculation unit is used that is inexpensive and has a slow processing speed.

In the parking assistance device of the embodiment, the event detection unit detects, as the event, any one event or a plurality of events among: an event that parking assistance operation is started and the vehicle is moved by a predetermined distance; an event that a remaining distance that is a distance between the vehicle and the parking target position is less than a distance that is required until the vehicle stops and that is calculated first by the calculation unit; an event that braking operation is detected; or an event that a target position is updated. As a result, the calculation unit can perform the recalculation only when the event occurs, and the processing load can be reduced. Furthermore, as the calculation unit, a calculation unit can be used that is inexpensive and has a slow processing speed.

In the parking assistance device of the embodiment, the calculation unit calculates the target speed by using a plurality of decelerations in which a small deceleration is set when the remaining distance that is a distance between the vehicle and the parking target position is large and a large deceleration is set when the remaining distance is small. As a result, when the remaining distance is large, the vehicle can be guided at a relatively high speed to shorten the time to complete parking, and when the remaining distance is short, the vehicle can be guided at a low speed to improve safety.

The parking assistance method of the embodiment includes: a calculation step in which a calculation unit calculates a target speed with passage of time until a vehicle is moved to a parking target position; an event detection step in which an event detection unit detects an event that is a predetermined event indicating a timing of recalculation of the target speed; and an acquisition step in which an acquisition unit acquires a current actual speed of the vehicle. Then, in the calculation step, when the event is detected, the calculation unit recalculates the target speed to match the target speed with the current actual speed of the vehicle. In this way, by performing calculation in consideration of a current actual vehicle speed when recalculating the target speed, a target vehicle speed can be calculated toward a stop position from the current actual vehicle speed even if the target vehicle speed and the actual vehicle speed largely deviate from each other, so that the stop position can be controlled accurately. Furthermore, recalculation is performed only when the event occurs, not every predetermined cycle, so that a processing load of the calculation unit can be reduced, and parking assistance control can be executed even when a calculation unit is used that is inexpensive and has a slow processing speed.

The parking assistance program of the embodiment causes a computer to function as: a calculation unit that calculates a target speed with passage of time until a vehicle is moved to a parking target position; an event detection unit that detects an event that is a predetermined event indicating a timing of recalculation of the target speed; and an acquisition unit that acquires a current actual speed of the vehicle. Then, when the event is detected, the calculation unit recalculates the target speed to match the target speed with the current actual speed of the vehicle. In this way, by performing calculation in consideration of a current actual vehicle speed when recalculating the target speed, a target vehicle speed can be calculated toward a stop position from the current actual vehicle speed even if the target vehicle speed and the actual vehicle speed largely deviate from each other, so that the stop position can be controlled accurately. Furthermore, recalculation is performed only when the event occurs, not every predetermined cycle, so that a processing load of the calculation unit can be reduced, and parking assistance control can be executed even when a calculation unit is used that is inexpensive and has a slow processing speed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby

The invention claimed is:

1. A parking assistance device comprising:
a calculator that calculates a target speed with passage of time until a vehicle is moved to a parking target position;
an event detector that detects an event that is a predetermined event indicating a timing of recalculation of the target speed; and
an acquirer that acquires a current actual speed of the vehicle, wherein
when the event is detected, the calculator recalculates the target speed to match the target speed with the current actual speed of the vehicle, and
wherein the event detector detects, as the event, any one event or a plurality of events among: an event that parking assistance operation is started and the vehicle is moved by a predetermined distance; an event that a remaining distance that is a distance between the vehicle and the parking target position is less than a distance that is required until the vehicle stops and that is calculated first by the calculator; or an event that braking operation is detected.

2. The parking assistance device according to claim 1, wherein
the calculator
calculates the target speed by using a plurality of decelerations in which a small deceleration is set when a remaining distance that is a distance between the vehicle and the parking target position is large and a large deceleration is set when the remaining distance is small.

3. A parking assistance method comprising:
a calculation step in which a calculator calculates a target speed with passage of time until a vehicle is moved to a parking target position;
an event detection step in which an event detector detects an event that is a predetermined event indicating a timing of recalculation of the target speed; and
an acquisition step in which an acquirer acquires a current actual speed of the vehicle, wherein
in the calculation step, when the event is detected, the calculator recalculates the target speed to match the target speed with the current actual speed of the vehicle, and
wherein the event detector detects, as the event, any one event or a plurality of events among: an event that parking assistance operation is started and the vehicle is moved by a predetermined distance; an event that a remaining distance that is a distance between the vehicle and the parking target position is less than a distance that is required until the vehicle stops and that is calculated first by the calculator; or an event that braking operation is detected.

4. A non-transitory computer readable medium storing a parking assistance program that causes a computer to function as:
a calculator that calculates a target speed with passage of time until a vehicle is moved to a parking target position;
an event detector that detects an event that is a predetermined event indicating a timing of recalculation of the target speed; and
an acquirer that acquires a current actual speed of the vehicle, wherein
when the event is detected, the calculator recalculates the target speed to match the target speed with the current actual speed of the vehicle, and
wherein the event detector detects, as the event, any one event or a plurality of events among: an event that parking assistance operation is started and the vehicle is moved by a predetermined distance; an event that a remaining distance that is a distance between the vehicle and the parking target position is less than a distance that is required until the vehicle stops and that is calculated first by the calculator; or an event that braking operation is detected.

* * * * *